Patented Aug. 28, 1928.

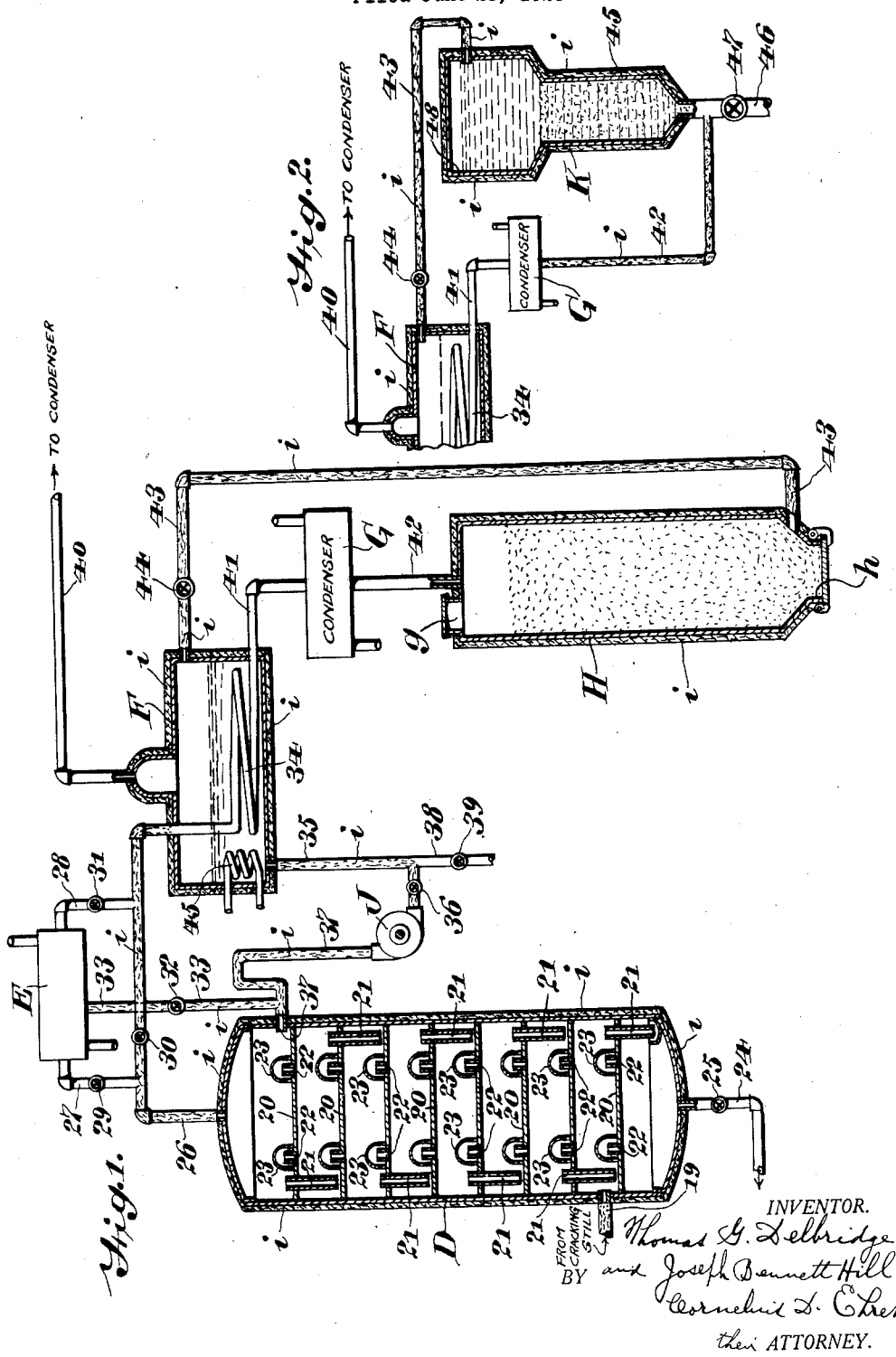

1,682,603

UNITED STATES PATENT OFFICE.

THOMAS G. DELBRIDGE AND JOSEPH BENNETT HILL, OF PHILADELPHIA, PENNSYLVANIA, ASSIGNORS TO THE ATLANTIC REFINING COMPANY, OF PHILADELPHIA, PENNSYLVANIA, A CORPORATION OF PENNSYLVANIA.

LIQUID PHASE PURIFICATION OF DISTILLATES.

Application filed June 28, 1926. Serial No. 118,953.

Our invention relates to the removal of gum-forming and color-imparting bodies from distillates of mineral oils, including gasoline, lamp oils and other petroleum products, with particular reference to naphthas formed by cracking of oils of higher boiling point.

In accordance with our invention, the oil is purified by bringing it into contact with a mass of fuller's earth or equivalent catalyst or material while at a temperature in excess of its normal boiling point and under sufficient pressure to maintain the oil in the liquid phase, thereby effecting polymerization of the undesirable components of the liquid oil, and by separation of the treated oil from the polymerized products resulting from the action of the catalyst effected by distillation, more particularly, by releasing the pressure on the oil and bringing untreated vapors into heat transfer relation with the treated oil, thereby partially condensing these vapors, vaporizing the liquid oil, and leaving the polymers as residue or in a residuum which may be used as reflux oil in fractionation of the untreated vapors.

Mineral oils, as naphthas and gasolines, particularly those formed by cracking higher boiling gas oils, fuel oils, etc., contain undesirable color-imparting and gum-forming compounds which cause a disagreeable color and odor and may deposit tarry, resinous material in storage tanks or in the carburetors of internal combustion engines. These undesirable compounds are unsaturated hydrocarbons, largely diolefines.

Various methods have been used for their removal, the most common of which is treatment with sulphuric acid, followed by neutralization and redistillation. Aside from the cost of the chemicals and redistillation, this method is unsatisfactory due to the high losses resulting from the reaction of sulphuric acid with other unsaturated materials in the oils, as olefines, which may not have a deleterious effect upon the oil under treatment, but on the other hand, in the case of motor fuel are desirable constituents due to their ability to withstand higher compression in an internal combustion engine without detonation than do the saturated compounds.

An alternative method of treatment of mineral oils is to bring them into contact with an adsorbent or catalyst such as fuller's earth, which does not affect the olefines and other desirable unsaturated compounds but which has an adsorptive or polymerizing effect on the gum-forming and color-imparting bodies. In the case of cracked oils which are comparatively very rich in these bodies, this treatment is not effective at ordinary temperatures and it has been proposed that the vapor of the oil be passed through a bed of the catalyst substantially at the temperature of the vapor, producing polymerization of the objectionable bodies and adsorption of the polymers by the catalyst. In this process the catalyst soon becomes clogged with the polymers and loses its refining efficiency.

It is an object of our invention to remove these objectionable compounds by subjecting the oil in the liquid phase, while at elevated temperature and under pressure, to the polymerizing action of fuller's earth, bauxite, charcoal or similar catalyst or material. Since high temperature is necessary for efficient polymerizing action of the clay on these objectionable bodies, we carry out the treatment at a temperature even above the normal boiling point of the oil but under sufficient pressure to maintain it in the liquid phase. In our process advantage is taken of the fact that the polymerized bodies remain to substantial extent or almost completely in solution in the oil and the effective life of the clay is thereby increased since it is permitted to act more as a catalyst and less as an adsorbent.

After separation of the treated oil from the clay, we separate the oil from the polymers by distillation whereby the polymers are left behind in the distillation residue. It is a further object of our invention to effect this redistillation with the least possible expenditure of heat and to this end we make use of the heat in the untreated vapors to distill the treated liquid. We accomplish this by condensing the vapors under superatmospheric pressure and by redistilling at substantially atmospheric pressure. The heat of vaporization is thereby given up by the condensing vapors at a higher temperature than that at which it must be supplied to the boiling liquid and may be used directly to boil the treated liquid by bringing the condensing vapor into suitable heat transfer relation therewith.

Our invention resides in a method and system of the character hereinafter described and claimed.

For an understanding of our invention, reference is had to the drawing in which Fig. 1 shows one form of apparatus suitable for carrying out a process in accordance with our invention, and Fig. 2 shows a modification.

A fractionating column D is connected near its lower end to a source of oil vapors, as for example a cracking still, by the line 19. The column is provided with fractionating devices, for example the bubbler plates 20, equipped with the down-flow pipes 21 and the vapor uptakes 22 covered by the bubbler caps 23. From the lower end extends the liquid drawoff line 24 controlled by the valve 25, while from the upper end the vapor line 26 extends to the coil 34 located in the still F. A partial condenser E is connected to the line 26 by the pipes 27 and 28 provided with the valves 29 and 31, respectively. The valve 30 controls the passage of vapor through the portion of the line 26 which bypasses the partial condenser E. Extending downwardly from the partial condenser E is the line 33, controlled by the valve 32, discharging into the column D through the line 37.

Leading from the still F to the pump J is the discharge line 35, controlled by the valve 36. The trapped line 37 leads from the pump J to a point near the top of the fractionating column D. Connected to the discharge 35 is the line 38, controlled by the valve 39, leading to a storage tank or back to the cracking system. A vapor line 40 leads from the still F to a condenser, not shown. One or more steam coils 45 are provided in the still F to be used for heating when necessary.

Extending from the coil 34 is the pipe 41 which connects to a condenser G which in turn is connected by the line 42 to the top of clay filter H. Fuller's earth or equivalent material may be charged into the chamber H through the manhole $g$ and after exhaustion withdrawn through the discharge outlet $h$. The manhole $g$ and outlet $h$ are both provided with pressure-tight closures. From the bottom of the filter the line 43, in which is placed the automatic or manually operated pressure-releasing or reducing valve 44, leads to the still F. Those portions of the apparatus from which undesirable heat losses by radiation may take place are preferably covered with heat insulating material, as indicated at $i$.

In the operation of the process petroleum vapors containing undesirable gum-forming and color-imparting bodies are introduced, under pressure, from a cracking system or still through the line 19 into the lower end of the column D and, passing upwardly in contact with descending reflux liquid, are fractionated, the lower boiling portion passing off as vapor through the line 26, while the higher boiling portion is drawn off from the lower end of the column through the line 24.

In our preferred method of operation the partial condenser E is by-passed by closing the valves 29 and 31 and opening the valve 30. This allows all the vapor to pass through the line 26 to the coil 34 in the still F. Contained in the still F is a body of treated liquid oil which is at substantially atmospheric pressure. The impure vapors passing through the coil 34, under pressure, are at a temperature substantially above the boiling point of this body of treated oil, which is at atmospheric pressure, so that a portion of the vapors condense and in so doing liberate their heat of vaporization which serves to vaporize a portion of the treated oil.

The mixture of oil and uncondensed vapors passes from the coil 34 through the line 41 to the condenser G where the remaining portion of the vapors is condensed. Conditions are so regulated in the condenser G that substantially no cooling of the liquid below its temperature of complete condensation is effected, for it is desirable to treat the condensed liquid distillate with fuller's earth or other catalyst at as high a temperature as possible.

The hot liquid oil passes through the line 42 to the clay filter H in which it percolates through a mass of fuller's earth, or equivalent, and is so brought into intimate contact therewith. The contact of the hot liquid oil with the fuller's earth or other catalyst effects removal of gum-forming and color-imparting bodies largely by polymerization with the formation of high boiling compounds.

The treated oil leaves the bottom of the filter through the line 43 and carries in solution high boiling polymers formed by the action of the clay on the hot impure liquid. The removal of polymers in solution in the treated oil serves to maintain the clay in an active state for a longer period than in those processes in which the treatment is carried out in the vapor phase causing the major portion of the polymer fraction to be retained by the clay thereby reducing its activity.

The distillate containing the polymers flows through the line 43, through the pressure-reducing valve 44 so that, upon discharge into the still F, it is under substantially atmospheric pressure. Here, due to the reduction in pressure, the heat from the vapors in the coil 34 and additional heat which may be supplied from the steam coil 45, the desired portion of the treated distillate is vaporized and passes by pipe 40 to a condenser, not shown, from which is obtained a purified distillate substantially free from gum-forming and color-imparting bodies.

At the same time liquid oil is continuously withdrawn from the still through the line 35 to act as reflux in the fractionating column D. The valve 36 is opened and the valve 39 in the pipe 38 is closed, so that the oil passes to the pump J. With the valve 32 in the line 33 closed, the oil is pumped through the line 37 to the upper end of the column D and is discharged onto the topmost plate 20. In passing downwardly the lower boiling portion is revaporized while the high boiling polymer fraction descends through the column in the reflux liquid and is drawn off at the lower end through the line 24.

The operation may be modified by partially or entirely closing the valve 30 and opening the valves 29 and 31, so that a part or all of the vapors may be passed through the partial condenser E and a sufficient quantity may be condensed to serve as reflux liquid for the column D. This reflux liquid is returned to the topmost plate 20 through the lines 33 and 37. It is then unnecessary to return treated oil from the still F for reflux. The liquid in the still, containing the polymers in solution may be continuously or intermittently drained through the lines 35 and 38, as when the valve 36 is closed and the valve 39 opened.

The thermal efficiency of the process as regards the completeness of heat interchange between the condensing untreated vapor and the boiling treated liquid depends principally on the pressure differential. For example, with a certain specific gasoline the temperature of the entering vapor under a pressure of 30 pounds per square inch gauge, is 400° F. This product is completely condensed under the same pressure at a temperature of 260° F. The equilibrium boiling point for 90% vaporization of the same gasoline at atmospheric pressure is 300° F. It can be shown from these relations that if 90% of the treated liquid is to be redistilled, the maximum theoretical thermal efficiency of the process based on the heat in the entering vapor is about 72%. By increasing the pressure differential this theoretical efficiency may be brought up to 100%. Under those conditions the auxiliary steam coil 45 in the still F and the condenser G are unnecessary. Pressures of the order of 65 pounds per square inch have been found generally to accomplish this for normal gasolines.

In Fig. 2 is shown a modified form of treating chamber K which is so built that the fuller's earth or other catalyst may be held in suspension in liquid oil. In this modification the catalyst treating chamber K consists of a lower cylindrical portion 45 above which is a portion 48 of greater cross-section. The line 42 leading from the condenser G is connected to the lower portion of the treating chamber through the discharge line 46. The line 43 leads from a point adjacent the top of the treating chamber to the still F.

In operation a mixture of fuller's earth and oil, preferably treated distillate of a boiling range similar to that under treatment or to be treated, is pumped through the line 46, into the chamber K. The valve 47 is then closed and hot liquid distillate from the condenser G is fed into the lower end of the treating chamber K through the lines 42 and 46. The liquid passes upwardly in contact with the clay held in suspension in the original oil charged to the vessel and pruification of the incoming oil is thus effected. The velocity of the oil from coil 34 is sufficient to keep the clay agitated and in suspension but, as the oil passes to the upper portion 48, of larger diameter, the velocity decreases so that the clay settles out and treated oil, free from clay, passes from the vessel through the line 43 and is discharged through the valve 44 into the still F at atmospheric pressure.

In each case liquid oil is brought into intimate contact with fuller's earth or other catalyst while at elevated temperature thereby effecting removal of gum-forming and color-imparting bodies which are largely converted to high boiling polymers the major portion of which are dissolved by the distillate and carried to the still F, thus lengthening the period of activity of the fuller's earth.

For brevity in the appended claims, the term "fuller's earth" includes that material and equivalent materials.

What we claim is:

1. In the art of refining cracked petroleum distillates, the method which comprises fractionating the vapors of the distillate by contact with reflux liquid, condensing the vapors, bringing the condensate in liquid phase at a temperature substantially above its normal boiling point into contact with fuller's earth to effect polymerization of gum-forming and color-imparting bodies, maintaining thereon while in contact with the fuller's earth a super-atmospheric pressure of such magnitude as to maintain the oil in liquid phase, transporting polymers from the fuller's earth by the oil, thereafter distilling the treated oil to effect separation of lower boiling point vapors from higher boiling point oil containing the polymers in solution, and utilizing said higher boiling oil as reflux liquid in said fractionation.

2. In the art of refining cracked petroleum distillates to effect removal of gum-forming and color-imparting bodies, the method which comprises fractionating the vapors of the distillate under super-atmospheric pressure, by contact with reflux liquid, condensing the vapors under pressure, bringing the oil under pressure in liquid phase at a temperature substantially above its normal boiling point into contact with fuller's earth to effect polymerization of gum-forming and color-imparting bodies, transporting polymers from the fuller's earth by the oil, thereafter distilling the treated oil at materially lower pressure to separate oil from the polymers, utilizing in the distillation heat abstracted from said vapors by passing them into heat interchange relation with the treated oil, anl utilizing the residue from the distillation as said reflux liquid.

3. In the art of refining cracked petroleum distillates, the method which comprises condensing the vapors of the distillate, bringing the oil in liquid phase at a temperature substantially above its normal boiling point into contact with fuller's earth to effect polymerization of gum-forming and color-imparting bodies, maintaining thereon while in contact with the fuller's earth a super-atmospheric pressure of such magnitude as to maintain the oil in liquid phase, transporting polymers from the fuller's earth by the treated distillate, thereafter distilling the treated distillate at a materially lower pressure, and utilizing in the distillation heat abstracted from said vapors by passing them into heat interchange relation with the treated distillate.

4. In the art of refining cracked petroleum distillates, the method which comprises condensing the vapors of the distillate, bringing the oil in liquid phase at a temperature substantially above its normal boiling point into contact with fuller's earth to effect polymerization of gum-forming and color-imparting bodies, maintaining thereon while in contact with the fuller's earth a pressure of at least 30 pounds per square inch above atmospheric, transporting polymers from the fuller's earth by the treated distillate, thereafter distilling the treated distillate at a materially lower pressure, and utilizing in the distillation heat abstracted from said vapors by passing them into heat interchange relation with the treated distillate.

5. The method of producing lower from higher boiling point hydrocarbon oils and of purifying the lower boiling oils which comprises subjecting the higher boiling oils to cracking temperature under super-atmospheric pressure, fractionating the resultant vapors by contact with reflux liquid oil, thereafter condensing the vapors under super-atmospheric pressure, passing the condensate under super-atmospheric pressure and while at a temperature substantially above its normal boiling temperature into contact with fuller's earth, transporting polymers from the fuller's earth by the oil, thereafter distilling the oil at lower pressure, and utilizing in the distillation heat abstracted from said fractionated vapors by passing them into heat interchange relation with the oil.

THOMAS G. DELBRIDGE.
JOSEPH BENNETT HILL.